(12) United States Patent
Tang et al.

(10) Patent No.: US 11,317,419 B2
(45) Date of Patent: Apr. 26, 2022

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Hai Tang, Dongguan (CN); Hua Xu, Ottawa (CA)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 161 days.

(21) Appl. No.: 16/610,030

(22) PCT Filed: May 3, 2017

(86) PCT No.: PCT/CN2017/082900
§ 371 (c)(1),
(2) Date: Oct. 31, 2019

(87) PCT Pub. No.: WO2018/201344
PCT Pub. Date: Nov. 8, 2018

(65) Prior Publication Data
US 2020/0205159 A1 Jun. 25, 2020

(51) Int. Cl.
*H04W 72/04* (2009.01)
*H04L 1/16* (2006.01)

(52) U.S. Cl.
CPC ....... *H04W 72/0493* (2013.01); *H04L 1/1614* (2013.01); *H04W 72/0446* (2013.01); *H04W 72/0453* (2013.01)

(58) Field of Classification Search
CPC ............ H04W 72/04; H04W 72/0493; H04W 72/0453; H04W 72/0446; H04L 1/1614; H04L 1/16
See application file for complete search history.

(56) References Cited

U.S. PATENT DOCUMENTS

2010/0118807 A1* 5/2010 Seo ............... H04W 72/042
370/329
2011/0164584 A1 7/2011 Seo
(Continued)

FOREIGN PATENT DOCUMENTS

CN 101291512 A 10/2008
CN 101562839 A 10/2009
(Continued)

OTHER PUBLICATIONS

Notice of Allowance of the Russian application No. 2019137009, dated Jun. 29, 2020.
(Continued)

*Primary Examiner* — Kyaw Z Soe
(74) *Attorney, Agent, or Firm* — Ladas & Parry LLP

(57) ABSTRACT

Disclosed by the embodiments of the present application are a wireless communication method, a terminal device and a network device, the method comprising: a terminal device receives a first bit map sent by a network device, the first bit map being used for indicating time-domain resources allocated by the network device to the terminal device in a first frequency-domain resource unit; and the terminal device carries out data transmission with the network device on the time-domain resources indicated by the first bit map. The method, terminal device and network device according to the embodiments of the present application may improve the flexibility of time domain scheduling.

18 Claims, 5 Drawing Sheets

(56) References Cited

U.S. PATENT DOCUMENTS

| | | | |
|---|---|---|---|
| 2012/0127938 A1 | 5/2012 | Lv | |
| 2012/0287885 A1 | 11/2012 | Dai | |
| 2013/0182679 A1 | 7/2013 | Seo | |
| 2015/0131592 A1 | 5/2015 | Seo | |
| 2017/0135105 A1* | 5/2017 | Li | H04W 72/12 |

FOREIGN PATENT DOCUMENTS

| | | | |
|---|---|---|---|
| CN | 102238732 A | 11/2011 | |
| CN | 105099634 A | 11/2015 | |
| CN | 106452651 A | 2/2017 | |
| EP | 2509380 A1 | 10/2012 | |
| EP | 3461200 A1 | 3/2019 | |
| EP | 3490316 A1 | 5/2019 | |
| JP | 2011525748 A | 9/2011 | |
| KR | 20110030442 A | 3/2011 | |
| RU | 2586073 C2 | 6/2016 | |
| WO | 2011134316 A1 | 11/2011 | |
| WO | 2017024563 A1 | 2/2017 | |

OTHER PUBLICATIONS

MCC Support. Draft Report of 3GPP TSG RAN WG3 #88bis v0.1.0 (Spokane, USA, Apr. 3-7, 2017), 3GPP TSG RAN WG1 Meeting #89 R1-17xxxxx, Hangzhou, China, May 15-19, 2017.
Huawei et al: "Resource allocation and indication for data channel", 3GPP Draft; R1-1705069, 3rd Generation Partnership Project (3GPP), Mobile Competence Centre; 650, Route Des Lucioles; F-06921 Sophia-Antipolis Cedex; France, vol. RAN WG1, no. Spokane, USA; 20170403-20110407, Apr. 2, 2017 (Apr. 2, 2017), XP051243200, p. 3, Option 2: Dynamic indication of a bandwidth part.
Samsung: "Resource Allocation Aspects", 3GPP Draft; R1-1705399 Resource Allocation, 3rd Generation Partnership Project (3GPP), Mobile Competence Centre, 650, Route Des Lucioles; F-06921 Sophia-Anti Polis Cedex; France, vol. RAN WG1, no. Spokane, USA; 20170403-20110407, Apr. 2, 2017 (Apr. 2, 2017), XP051243529, p. 2, Frequency Domain Resource Allocation.
Supplementary European Search Report in corresponding European applicaton No. 17908127.8, dated Feb. 27, 2020.
English Translation of the Written Opinion of the International Search Authority in corresponding international application No. PCT/CN2017/082900, dated Jan. 26, 2018.
International Search Report in the international application No. PCT/CN2017/082900, dated Jan. 26, 2018.
Written Opinion of the International Search Authority in the international application No. PCT/CN2017/082900, dated Jan. 26, 2018.
Supplementary European Search Report in the European application No. 21170502.5, dated May 10, 2021.
First Office Action of the Korean application No. 10-2019-7032229, dated Apr. 29, 2021.
First Office Action of the Japanese application No. 2019-557600, dated Mar. 2, 2021.
Written Opinion of the Singaporean application No. 11201909893R, dated Apr. 13, 2021.
First Office Action of the Chilean application No. 201903101, dated Sep. 17, 2020.
First Office Action of the Canadian application No. 3060623, dated Nov. 30, 2020.
First Office Action of the Chinese application No. 201911323309.3, dated Nov. 3, 2020.
First Office Action of the Taiwanese application No. 107114476, dated Jun. 30, 2021.
Decision of Refusal of the Japanese application No. 2019-557600, dated Jul. 6, 2021.
Office Action of the Indian application No. 201917048799, dated Jul. 13, 2021.
First Decision of Refusal of the Korean application No. 10-2019-7032229, dated Nov. 11, 2021.
Second Decision of Refusal of the Korean application No. 10-2019-7032229, dated Dec. 22, 2021.
Reconsideration Examination Report of the Japanese application No. 2019-557600, dated Dec. 7, 2021.
First Office Action of the Israeli application No. 270195, dated Jan. 9, 2022.

* cited by examiner ical Field

Embodiments of the disclosure relate to the field of communications, and more particularly to a method for wireless communication, a terminal device, and a network device.

BACKGROUND

In a long term evolution (LTE) system, time-domain granularities for data channel resource allocation include a slot (including 7 symbols) and a subframe (including 14 symbols), and a time-frequency resource of a data channel is scheduled through a physical downlink control channel (PDCCH) by taking a slot and subframe as a time-domain unit. However, such a scheduling mode is relatively low in time-domain flexibility, relatively long in resource allocation delay and high in resource fragmentation rate, and efficient resource allocation may not be implemented.

SUMMARY

In view of this, the embodiments of the disclosure provide a method for wireless communication, a terminal device, and a network device, which may improve time-domain scheduling flexibility.

A first aspect provides a method for wireless communication, which includes that: a terminal device receives a first bitmap from a network device, the first bitmap being used to indicate a time-domain resource allocated for the terminal device by the network device in a first frequency-domain resource unit; and the terminal device performs data transmission with the network device on the time-domain resource indicated by the first bitmap.

Through the bitmap, not only continuous time-domain resources but also discontinuous time-domain resources may be indicated, so that time-domain scheduling flexibility may be improved.

The time-domain resource unit may be a scheduling unit in a time domain, and for example, may be a subframe or slot in LTE, and may also be a mini-slot or a time-domain scheduling unit consisting of a specific number of symbols in a new system such as 5th-Generation (5G). The frequency-domain resource unit may be a scheduling unit in a frequency domain, may be a physical resource block (PRB) and resource block group (RBG) in LTE or a frequency-domain scheduling unit consisting of a specific number of resource blocks in the new system, and may also be a sub-band.

In a possible implementation, each bit in the first bitmap may correspond to at least one time-domain resource unit in the first frequency-domain resource unit, and a value of each bit in the first bitmap may be used to indicate whether the corresponding at least one time-domain resource unit is used for data transmission.

In a possible implementation, each of bits in the first bitmap may correspond to a respective one of time-domain resource units in the first frequency-domain resource unit.

Optionally, different mapping relationships between bits in the first bitmap and time-domain resource units in the first frequency-domain resource unit may represent whether the resource units are used for data transmission of the terminal device.

In a possible implementation, a left-to-right sequence of the bits in the first bitmap may be consistent with a sequence of the time-domain resource units in the first frequency-domain resource unit.

Optionally, the left-to-right sequence of the bits in the first bitmap may be inconsistent with the sequence of the time-domain resource units in the first frequency-domain resource unit.

In a possible implementation, the time-domain resource unit may be at least one of a symbol, a symbol group, a slot, or a mini-slot.

In a possible implementation, after the operation that the terminal device receives the first bitmap from the network device, the method may further include that: the terminal device receives first indication information from the network device. The first indication information is to indicate a time-domain resource not available for data transmission of the terminal device in the first frequency-domain resource unit. The operation that the terminal device performs data transmission with the network device on the time-domain resource indicated by the first bitmap may include that: the terminal device performs data transmission with the network device on a time-domain resource, other than the time-domain resource indicated by the first indication information, in the time-domain resource indicated by the first bitmap.

Through the bitmap, not only the continuously distributed time-domain resources may be indicated, but also the discontinuous time-domain resources may be indicated, so that time-domain scheduling flexibility may be improved.

In a possible implementation, the first indication information may be a second bitmap, each bit in the second bitmap may correspond to at least one time-domain resource unit in the first frequency-domain resource unit, and a value of each bit in the second bitmap may be used to indicate whether the corresponding at least one time-domain resource unit is used for data transmission of the terminal device.

In a possible implementation, the method may further include that: the terminal device receives second indication information from the network device. The second indication information is to indicate at least one frequency-domain resource unit allocated for the terminal device by the network device. The at least one frequency-domain resource unit includes the first frequency-domain resource unit.

In a possible implementation, the second indication information may be a third bitmap, each of bits in the third bitmap may correspond to a respective one of frequency-domain resource units in a system bandwidth. A value of each bit in the third bitmap is to indicate whether the frequency-domain resource unit corresponding to the bit is used for data transmission of the terminal device.

In a possible implementation, the second indication information may specifically be used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

In a possible implementation, the frequency-domain resource unit may be a PRB, an RBG, or a sub-band.

A second aspect provides a method for wireless communication, which includes that: a network device sends a first bitmap to a terminal device. The first bitmap is to indicate a time-domain resource allocated for the terminal device by the network device in a first frequency-domain resource unit.

In a possible implementation, each bit in the first bitmap may correspond to at least one time-domain resource unit in the first frequency-domain resource unit, and a value of each bit in the first bitmap may be used to indicate whether the corresponding at least one time-domain resource unit is used for data transmission of the terminal device.

In a possible implementation, each of the bits in the first bitmap may correspond to a respective one of the time-domain resource units in the first frequency-domain resource unit.

In a possible implementation, a left-to-right sequence of the bits in the first bitmap may be consistent with a sequence of the time-domain resource units in the first frequency-domain resource unit.

In a possible implementation, the time-domain resource unit may be at least one of a symbol, a symbol group, a slot, or a mini-slot.

In a possible implementation, after the operation that the network device sends the first bitmap to the terminal device, the method may further include that: the network device sends first indication information to the terminal device. The first indication information is to indicate a time-domain resource not available for data transmission of the terminal device in the first frequency-domain resource unit.

In a possible implementation, the first indication information may be a second bitmap, each bit in the second bitmap may correspond to at least one time-domain resource unit in the first frequency-domain resource unit, and a value of each bit in the second bitmap may be used to indicate whether the corresponding at least one time-domain resource unit is used for data transmission of the terminal device.

In a possible implementation, the method may further include that: the network device sends second indication information to the terminal device. The second indication information is to indicate at least one frequency-domain resource unit allocated for the terminal device by the network device. The at least one frequency-domain resource unit includes the first frequency-domain resource unit.

In a possible implementation, the second indication information may be a third bitmap. Each of bits in the third bitmap may correspond to a respective one of frequency-domain resource units in a system bandwidth. A value of each bit in the third bitmap is to indicate whether the frequency-domain resource unit corresponding to the bit is used for data transmission of the terminal device.

In a possible implementation, the second indication information may specifically be used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

In a possible implementation, the frequency-domain resource unit may be a PRB, an RBG, or a sub-band.

A third aspect provides a terminal device, which is configured to execute the method in the first aspect or any possible implementation of the first aspect. Specifically, the terminal device includes units configured to execute the method in the first aspect or any possible implementation of the first aspect.

A fourth aspect provides a network device, which is configured to execute the method in the second aspect or any possible implementation of the second aspect. Specifically, the network device includes units configured to execute the method in the second aspect or any possible implementation of the second aspect.

A fifth aspect provides a terminal device, which includes a memory, a processor, an input interface, and an output interface. The memory, the processor, the input interface, and the output interface are connected through a bus system. The memory is configured to store instructions. The processor is configured to execute the instructions stored in the memory to execute the method in the first aspect or any possible implementation of the first aspect.

A sixth aspect provides a network device, which includes a memory, a processor, an input interface, and an output interface. The memory, the processor, the input interface, and the output interface are connected through a bus system. The memory is configured to store instructions. The processor is configured to execute the instructions stored in the memory to execute the method in the second aspect or any possible implementation of the second aspect.

A seventh aspect provides a computer storage medium, which is configured to store computer software instructions for executing the method in the first aspect or any possible implementation of the first aspect or the method in the second aspect or any possible implementation of the second aspect, including a program designed to execute the method in each aspect.

These aspects or other aspects of the disclosure will become clearer and easier to understand through the following descriptions about the embodiments.

DETAILED DESCRIPTION

Figure 1:
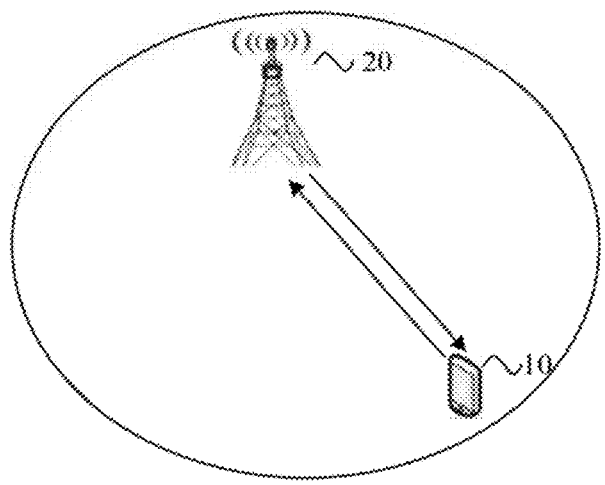
FIG. 1 is a schematic diagram of an application scenario according to an embodiment of the disclosure.

The technical solutions in the embodiments of the disclosure will be clearly and completely described below in combination with the drawings in the embodiments of the disclosure.

It is to be understood that the technical solutions of the embodiments of the disclosure may be applied to various communication systems, for example, a global system of mobile communication (GSM), a code division multiple access (CDMA) system, a wideband code division multiple access (WCDMA) system, a general packet radio service (GPRS), an LTE system, an LTE frequency division duplex (FDD) system, LTE time division duplex (TDD), a universal mobile telecommunication system (UMTS), a worldwide interoperability for microwave access (WiMAX) communication system or a future $5^{th}$ generation wireless communication system.

Particularly, the technical solutions of the embodiments of the disclosure may be applied to various nonorthogonal multiple access technology-based communication systems, for example, a sparse code multiple access (SCMA) system and a low density signature (LDS) system and the like. The SCMA system and the LDS system may also have other names in the field of communications. Furthermore, the technical solutions of the embodiments of the disclosure may be applied to multi-carrier transmission systems adopting nonorthogonal multiple access technologies, for example, orthogonal frequency division multiplexing (OFDM), filter bank multi-carrier (FBMC), generalized frequency division multiplexing (GFDM) and filtered-OFDM (F-OFDM) systems adopting the nonorthogonal multiple access technologies.

In the embodiments of the disclosure, a terminal device may refer to user equipment (UE), an access terminal, a user unit, a user station, a mobile station, a mobile radio station, a remote station, a remote terminal, a mobile device, a user terminal, a terminal, a wireless communication device, a user agent or a user apparatus. The access terminal may be a cell phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, UE in a future 5G network, UE in a future evolved public land mobile network (PLMN) or the like. There are no limits made in the embodiments of the disclosure.

In the embodiments of the disclosure, a network device may be a device configured to communicate with the terminal device. The network device may be a base transceiver station (BTS) in the GSM or the CDMA, may also be a NodeB (NB) in the WCDMA system, may also be an evolutional Node B (eNB or eNodeB) in the LTE system and may further be a wireless controller in a cloud radio access network (CRAN) scenario. Or, the network device may be a relay station, an access point, a vehicle-mounted device, a wearable device, a network device in the future 5G network, a network device in the future evolved PLMN or the like. There are no limits made in the embodiments of the disclosure.

FIG. 1 is a schematic diagram of an application scenario according to an embodiment of the disclosure. A communication system illustrated in FIG. 1 may include a terminal device 10 and a network device 20. The network device 20 is configured to provide communication services for the terminal device 10 for access to a core network. The terminal device 10 searches for a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20.

Figure 2:
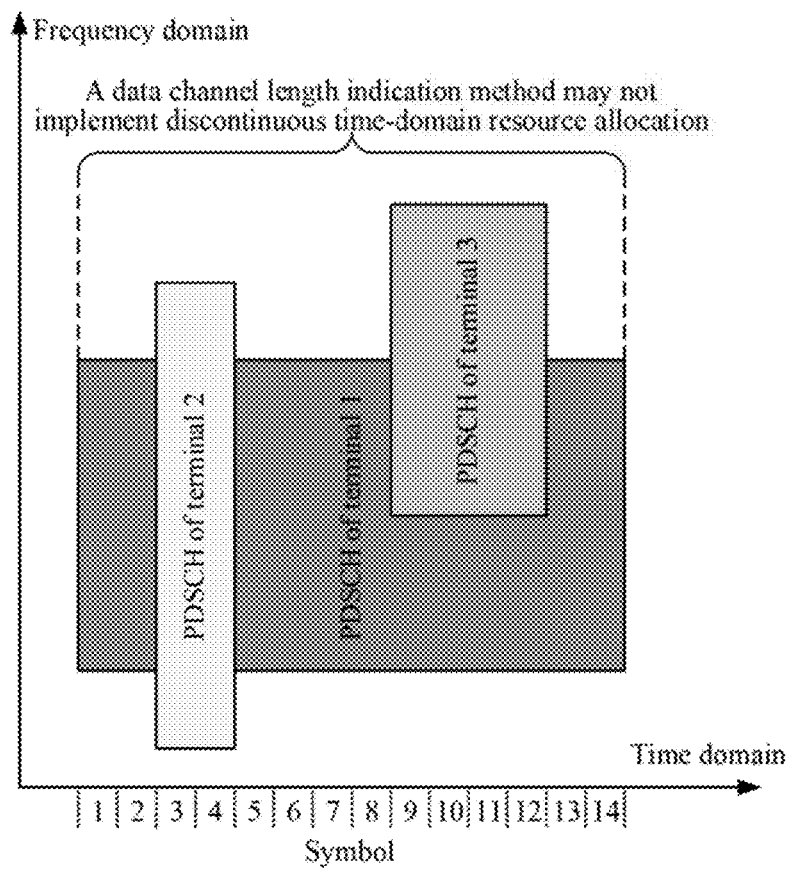
FIG. 2 is a schematic block diagram of a specific application scenario according to an embodiment of the disclosure.

With the evolution of a wireless communication system, for improving resource allocation flexibility and reducing a delay, in a New Radio (NR) system, flexibility of a time-domain position of a data channel has been greatly improved. Symbol may be taken as a unit for allocation time-domain resource of the data channel, and a time-domain starting point and time-domain length of the data channel may be flexibly configured. However, symbol-level resource allocation may make a shape of a resource region irregular. In a time-domain range scheduled by downlink control information (DCI), some symbols may be available but some symbols that have been scheduled for another terminal may not available, namely time-domain resources in a frequency-domain resource unit are discontinuously allocated and available symbols in different frequency-domain resource units are different, as illustrated in FIG. 2. Adopting a related method for indicating a time-domain starting point and a time-domain length may only indicate continuously distributed time-domain resources and may not implement allocation of discontinuous time-domain resources.

Figure 3:
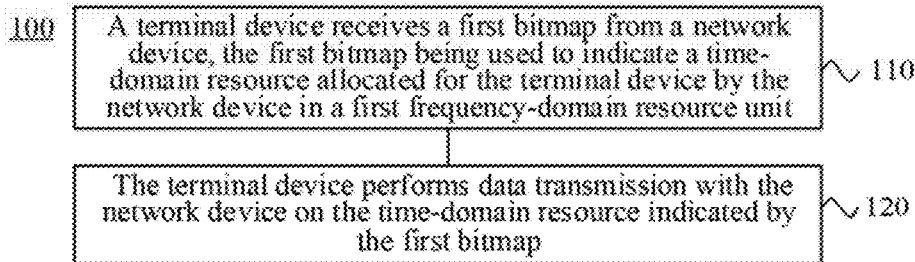
FIG. 3 is a schematic block diagram of a method for wireless communication according to an embodiment of the disclosure.

FIG. 3 is a schematic block diagram of a wireless communication method 100 according to an embodiment of the disclosure. As illustrated in FIG. 3, the method 100 includes the following operations.

In S210, a terminal device receives a first bitmap from a network device. The first bitmap is to indicate a time-domain resource allocated for the terminal device by the network device in a first frequency-domain resource unit.

In S220, the terminal device performs data transmission with the network device on the time-domain resource indicated by the first bitmap.

The network device may indicate, through a bitmap, a time-domain resource allocated for the terminal device in a frequency-domain resource unit to the terminal device. The time-domain resource unit may be a scheduling unit in a time domain, and for example, may be a subframe or slot in LTE, and may also be a mini-slot or a time-domain scheduling unit consisting of a specific number of symbols in a new system such as 5G. The frequency-domain resource unit may be a scheduling unit in a frequency domain, may be a PRB or an RBG in LTE, a frequency-domain scheduling unit consisting of a specific number of resource blocks in the new system, or a sub-band or the like.

It is to be understood that, in the embodiment of the disclosure, the operation of performing data transmission on the time-domain resource indicated by the first bitmap includes that data, i.e., downlink data, sent by the network device is received on the time-domain resource indicated by the first bitmap and also includes that data, i.e., uplink data, is sent to the network device on the time-domain resource indicated by the first bitmap.

The bitmap marks a value corresponding to an element with a bit. That is, in the embodiment of the disclosure, each bit in the first bitmap corresponds to at least one time-domain resource unit in the first frequency-domain resource unit. A value of each bit in the first bitmap is to indicate whether the at least one time-domain resource unit corresponding to the bit is used for data transmission or not.

Specifically, the network device may divide the time-domain resource units for a frequency-domain resource unit into multiple groups and represent each group with a bit in a bitmap. For example, 1 represents that the time-domain resource unit corresponding to the bit may be configured for data transmission of the terminal device. The bit may also be valued to be 0 to represent that the corresponding time-domain resource unit may be configured for data transmission of the terminal device, and in other words, the bit is valued to be 1 to represent that the time-domain resource unit corresponding to the bit may not be configured for data transmission of the terminal device. For example, the time-domain resource for a frequency-domain resource unit includes 14 symbols, and the 14 symbols may be divided into five groups including one symbol, two symbols, three symbols, four symbols and four symbols respectively. The bitmap includes 5 bits. One bit corresponds to the group with one symbol, and if the bit is 1, it may be represented that the symbol in the group is used for data transmission of the terminal device. Another bit corresponds to the group with two symbols, and if the bit is 1, it may be represented that both the two symbols in the group are used for data transmission of the terminal device, and so on.

Optionally, the network device may also determine, through mapping relationships between time-domain resource units in a frequency-domain resource unit and bits, whether the corresponding time-domain resource units are configured for data transmission of the terminal device or not. For example, a time-domain resource for a frequency-domain resource unit includes 14 symbols. The network device divides the time-domain resource corresponding to the frequency-domain resource unit into seven groups, each group including two adjacent symbols. The network device and the terminal device may predetermine that time-domain resource units in each group are represented with bits as follows: 11 represents that both the two symbols in each group are used for data transmission of the terminal device and 00, 01 and 10 all represent that neither of the two symbols in each group is used for data transmission of the terminal device.

Optionally, the network device may configure that each of the bits in the first bitmap corresponds to a respective one of the time-domain resource units in the first frequency-domain resource unit. That is, one bit corresponds to one time-domain resource unit. For example, the time-domain resource for the first frequency-domain resource unit includes 14 symbols. The first bitmap includes 14 bits. If a value of the first bitmap is 11101101011111 and a left-to-right sequence of the bits in the first bitmap represents a sequence of the time-domain resource units in the first frequency-domain resource unit, 11101101011111 represents that all time-domain resource units 1, 2, 3, 5, 6, 8, 10, 11, 12, 13 and 14 in the first frequency-domain resource unit may be configured for data transmission of the terminal device. Similarly, the left-to-right sequence of the bits in the first bitmap may inconsistent with the sequence of the time-domain resource units in the first frequency-domain resource unit. For example, it may be predetermined that the first seven bits in the first bitmap sequentially represent symbols 1, 3, 5, 7, 9, 11 and 13 in the first frequency-domain resource unit and the last seven bits sequentially represent symbols 2, 4, 6, 8, 10, 12 and 14 in the first frequency-domain resource unit. Then, 11101101011111 represents that all the symbols 1, 3, 5, 9, 11, 2, 6, 8, 10 and 12 in the first frequency-domain resource unit may be configured for data transmission of the terminal device.

It is to be understood that the time-domain resource unit may be at least one of a symbol, a symbol group, a slot, or a mini-slot. For example, the time-domain resource corresponding to the first frequency-domain resource unit may include two slots. The first slot may be divided into four symbol groups. The two slots are represented with totally five bits, each of the first four bits corresponds to a responsive one of the four symbol groups in the first slot, the last bit corresponds to the second slot. If the value of the first bitmap is 11001, it is represented that time-domain resources in the first group and second group in the first slot are configured for data transmission of the terminal device and the whole time-domain resource of the second slot may be configured for data transmission of the terminal device.

Optionally, in the embodiment of the disclosure, after the operation that the terminal device receives the first bitmap from the network device, the method further includes that: the terminal device receives first indication information from the network device. The first indication information is to indicate a time-domain resource not available for data transmission of the terminal device in the first frequency-domain resource unit. The operation that the terminal device performs data transmission with the network device on the time-domain resource indicated by the first bitmap includes that: the terminal device performs data transmission with the network device on a time-domain resource, other than the time-domain resource indicated by the first indication information, in the time-domain resource indicated by the first bitmap.

Under a normal condition, after the network device indicates a configuration of a frequency-domain resource unit to the terminal device, if the network device finds that the time-domain resource originally allocated for the terminal device in the first frequency-domain resource unit may not available for data transmission of the terminal device anymore, the network device is required to notify the terminal device, and the terminal device may update the time-domain resource configured to transmit the data thereof in the first frequency-domain resource unit. For example, the first bitmap sent to the terminal device is 11001100110011 and the first indication information sent by the network device indicates that symbol 5 and symbol 6 may not available for transmission of the terminal device for some reasons. For example, the network device may allocate symbol 5 and symbol 6 for another terminal device. Then, the terminal device may acquire that the first bitmap may be updated to 11000000110011.

Optionally, in the embodiment of the disclosure, the first indication information is a second bitmap. Each bit in the second bitmap corresponds to at least one time-domain resource unit in the first frequency-domain resource unit, and a value of each bit in the second bitmap is to indicate whether the at least one time-domain resource unit corresponding to the bit is configured for data transmission of the terminal device or not.

A representation manner for the second bitmap may refer to a representation manner for the first bitmap and, for simplicity, will not be elaborated herein.

Optionally, a solution in a conventional art may also be adopted for the first indication information. That is, the first indication information indicates at least two of starting positions, time-domain lengths, or ending positions of some time-domain resource units in the first frequency-domain resource unit. The terminal device may determine the specific time-domain resource units indicated by the first indication information in the first frequency-domain resource unit based on the starting positions and the time-domain lengths, or the starting positions and the ending positions, or the time-domain lengths and the ending positions, etc.

Optionally, in the embodiment of the disclosure, the method further includes that: the terminal device receives second indication information from the network device. The second indication information is to indicate at least one frequency-domain resource unit allocated for the terminal device by the network device. The at least one frequency-domain resource unit includes the first frequency-domain resource unit.

Optionally, the second indication information is a third bitmap. Each of the bits in the third bitmap corresponds to a responsive one of frequency-domain resource units in a system bandwidth. A value of each bit in the third bitmap is to indicate whether the frequency-domain resource unit corresponding to the bit is configured for data transmission of the terminal device or not.

Optionally, the second indication information is specifically used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

Specifically, the network device may indicate the specific frequency-domain resource unit including time-domain resources allocated for the terminal device to the terminal device. After the terminal device receives information about the frequency-domain resource unit indicated by the network device, the terminal device may determine that all time-domain resources in the frequency-domain resource unit are available for data transmission of the terminal device. When the terminal device receives time-domain resources specifically allocated for the terminal device in a specific frequency-domain resource unit, the terminal device may determine the specific time-domain resources may be used for data transmission of the terminal device. Or, when the terminal device receives the specific time-domain resource units indicated by the network device, that may not available for data transmission of the terminal device in a specific frequency-domain resource unit, the terminal device may accordingly determine time-domain resource units available for data transmission of the terminal device.

From the above, according to the wireless communication method of the embodiment of the disclosure, continuous time-domain resources and discontinuous time-domain resources may be indicated, so that time-domain scheduling flexibility may be improved.

The solution of the embodiment of the disclosure will be described below in combination with FIG. 4 to FIG. 7 in detail.

Figure 4:
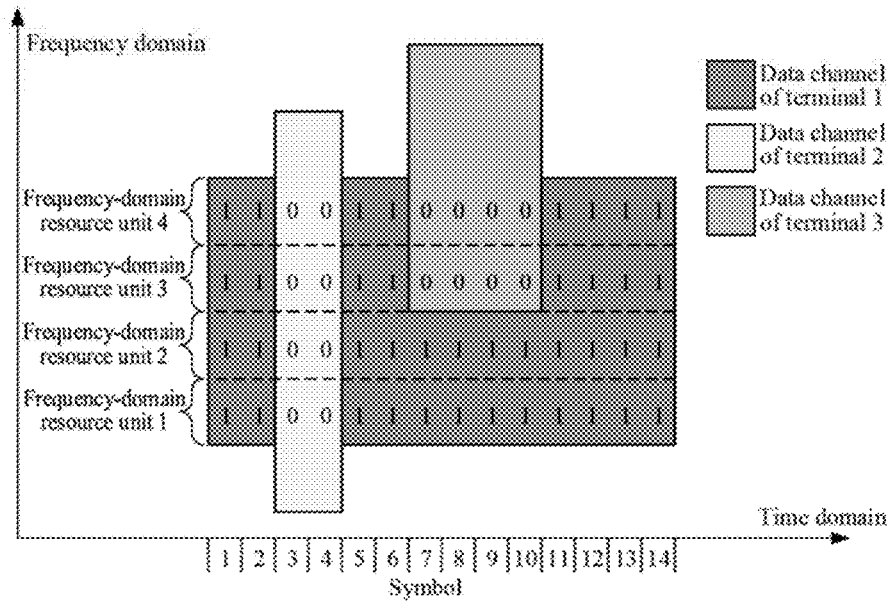
FIG. 4 is another schematic block diagram of a method for wireless communication according to an embodiment of the disclosure.

Embodiment 1: as illustrated in FIG. 4, the network device schedules time-frequency resources for a data channel of a terminal 1 within a time-frequency resource range including four frequency-domain resource units in a frequency domain and 14 symbols in a time domain, but part of resources within this range are allocated for a terminal 2 and a terminal 3. For each frequency-domain resource unit, a 14 bit bitmap is adopted to indicate time-domain resources for the terminal 1. In an example illustrated in FIG. 4, symbols 3 and 4 in each of the frequency-domain resource units 1 and 2 are allocated for the terminal 2, so that the resource indication bitmap for each of the two frequency-domain resource units is 11001111111111. Symbols 3 and 4 in each of the frequency-domain resource units 3 and 4 are allocated for the terminal 2, and symbols 7-10 in each of the frequency-domain resource units 3 and 4 are allocated for the terminal 3, so that the resource indication bitmap for each of the two frequency-domain resource units is 11001100001111.

Embodiment 1 has the advantage that the specific time-domain resource units available for data transmission of the terminal device in a frequency-domain resource unit may be obtained through a bitmap.

Figure 5:
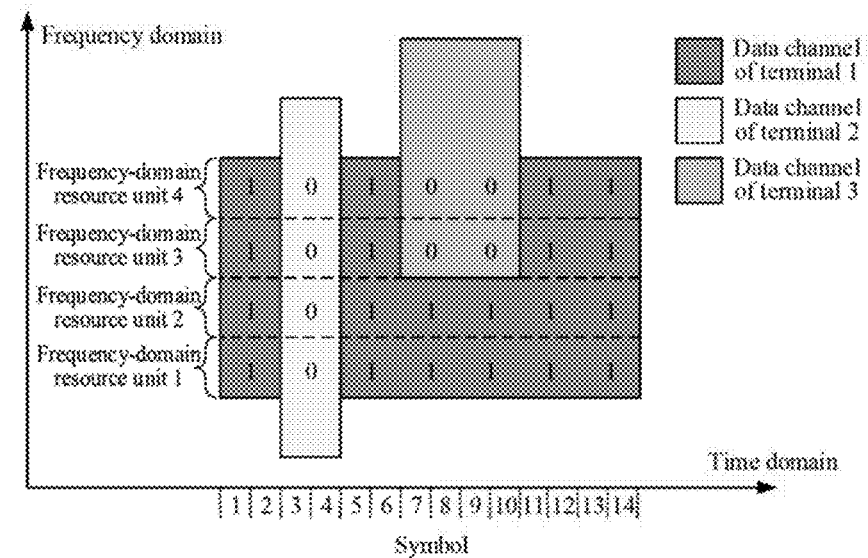
FIG. 5 is yet another schematic block diagram of a method for wireless communication according to an embodiment of the disclosure.
Figure 6:
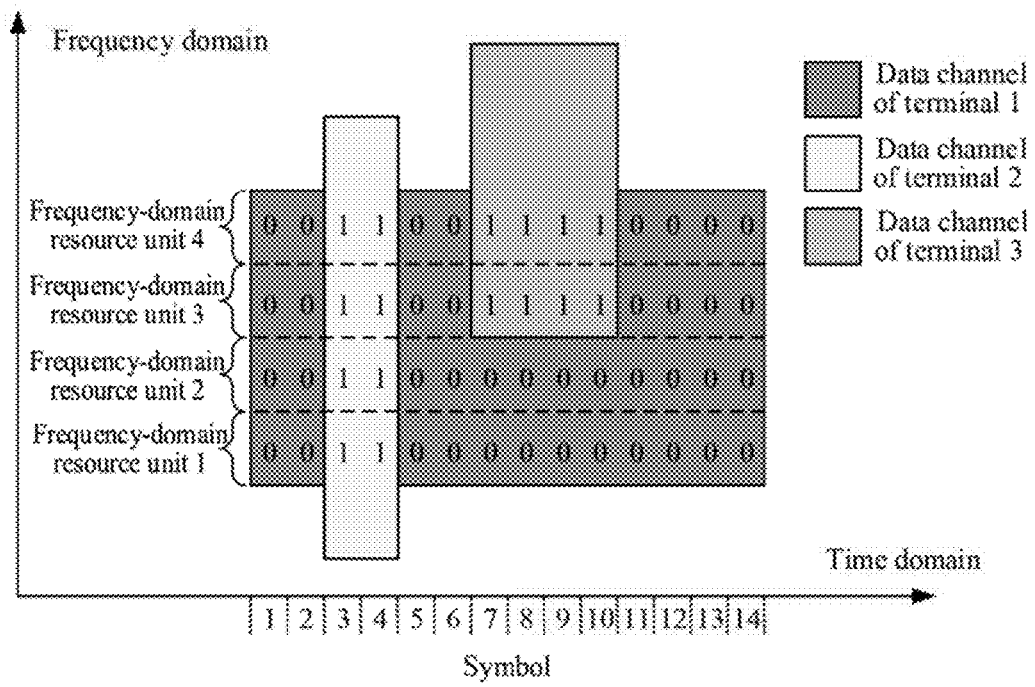
FIG. 6 is still another schematic block diagram of a method for wireless communication according to an embodiment of the disclosure.

Embodiment 2: the difference between this embodiment and embodiment 1 is that a time-domain resource allocation unit is a group of symbols (in an example illustrated in FIG. 5, two symbols form a group). For each frequency-domain resource unit, a 7 bit bitmap is adopted to indicate time-domain resources for the terminal 1. In the example illustrated in FIG. 5, second groups of symbols in each of the frequency-domain resource units 1 and 2 are allocated for the terminal 2, so that the resource indication bitmap for each of the two frequency-domain resource units is 1011111. Second groups of symbols in each of the frequency-domain resource units 3 and 4 are allocated for the terminal 2, and fourth and fifth groups of symbols in each of the frequency-domain resource units 3 and 4 are allocated for the terminal 3, so that the resource indication bitmap for each of the two frequency-domain resource units is 1010011.

Compared with embodiment 1, such a method has the advantage that the number of bits of the bitmap is smaller, so that an overhead may be reduced.

Embodiment 3: the difference between this embodiment and embodiment 1 is that time-domain resources not allocated for a terminal are indicated through a bitmap. In an example illustrated in FIG. 6, symbols 3 and 4 in each of the frequency-domain resource units 1 and 2 are allocated for another terminal, so that the resource indication bitmap for each of the two frequency-domain resource units is 00110000000000. Symbols 3-4 and symbols 7-10 in each of the frequency-domain resource units 3 and 4 are allocated for the other terminals, so that the resource indication bitmap for each of the two frequency-domain resource units is 00110011110000. The terminal may exclude the resources indicated by the bitmap from a large time-frequency resource range to determine the time-frequency resources allocated for the terminal.

Compared with embodiment 1, such a method has the advantage that resources allocated for at least two terminals may be simultaneously indicated through a bitmap, so that the same bitmap may be shared for resource indication of multiple terminals, and a control signaling overhead may be reduced.

Figure 7:
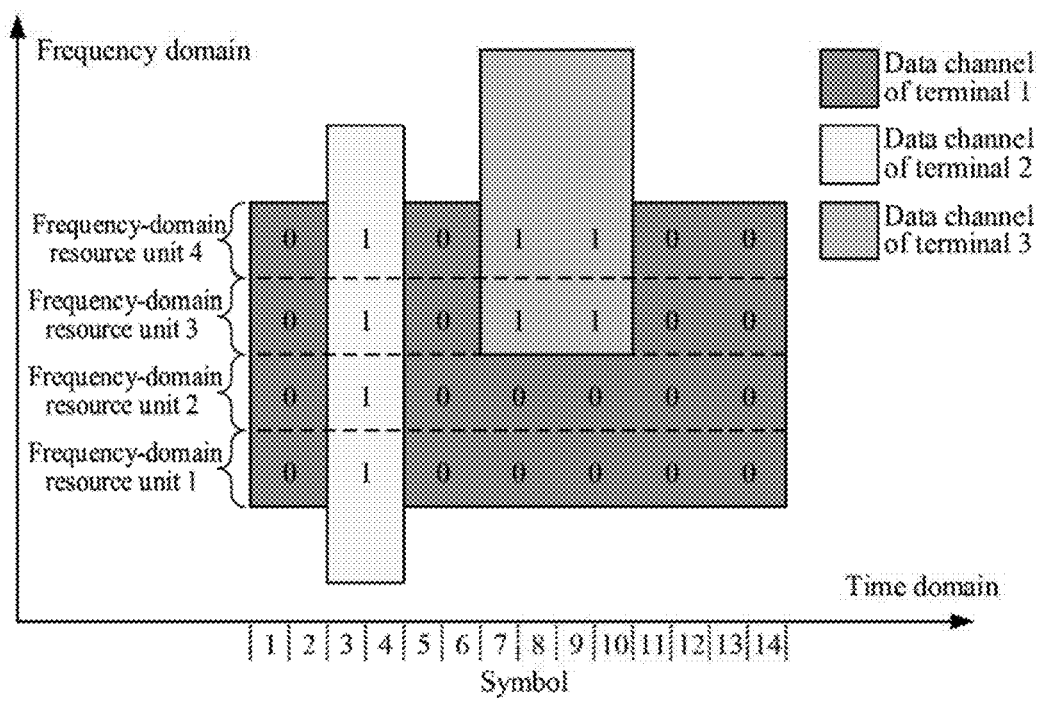
FIG. 7 is still another schematic block diagram of a method for wireless communication according to an embodiment of the disclosure.

Embodiment 4: the difference between this embodiment and embodiment 3 is that the time-domain resource allocation unit is a group of symbols (in an example illustrated in FIG. 7, two symbols form a group). For each frequency-domain resource unit, a 7 bit bitmap is adopted to indicate the time-domain resources for the terminal 1. In the example illustrated in FIG. 7, second groups of symbols in each of the frequency-domain resource units 1 and 2 are allocated for the terminal 2, so that the resource indication bitmap for each of the two frequency-domain resource units is 0100000. Second groups of symbols in each of the frequency-domain resource units 3 and 4 are allocated for the terminal 2, and fourth and fifth groups of symbols in each of the frequency-domain resource units 3 and 4 are allocated for the terminal 3, so that the resource indication bitmap for each of the two frequency-domain resource units is 0101100. The terminal may exclude the resources indicated by the bitmap from a large time-frequency resource range to determine the time-frequency resources allocated for the terminal.

Compared with embodiment 3, such a method has the advantage that the number of bits in the bitmap is smaller, so that the overhead may be reduced.

Figure 8:
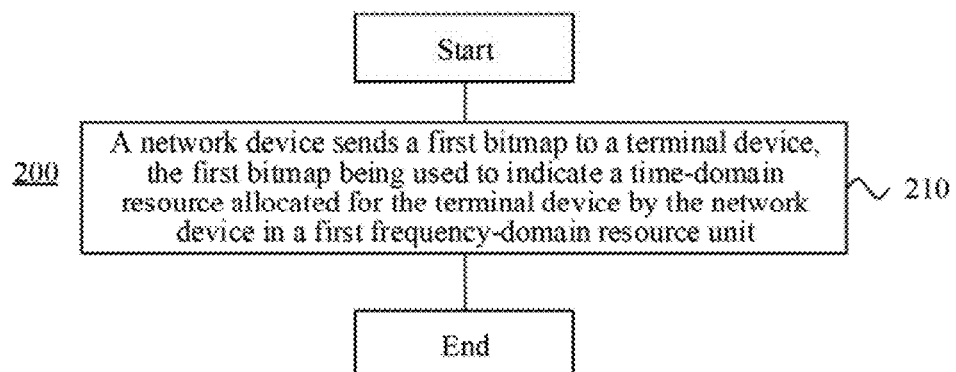
FIG. 8 is still another schematic block diagram of a method for wireless communication according to an embodiment of the disclosure.

FIG. 8 is a schematic block diagram of a wireless communication method 200 according to an embodiment of the disclosure. As illustrated in FIG. 8, the method 200 includes the following operation.

In S210, a network device sends a first bitmap to a terminal device. The first bitmap is to indicate a time-domain resource allocated for the terminal device by the network device in a first frequency-domain resource unit.

From the above, according to the wireless communication method of the embodiments of the disclosure, continuous time-domain resources and discontinuous time-domain resources may be indicated, so that time-domain scheduling flexibility may be improved.

Optionally, in the embodiment of the disclosure, each bit in the first bitmap corresponds to at least one time-domain resource unit in the first frequency-domain resource unit. A value of each bit in the first bitmap is to indicate whether the at least one time-domain resource unit corresponding to the bit is used for data transmission of the terminal device or not.

Optionally, in the embodiment of the disclosure, each of the bits in the first bitmap corresponds to a respective one of the time-domain resource units in the first frequency-domain resource unit.

Optionally, in the embodiment of the disclosure, a left-to-right sequence of the bits in the first bitmap is consistent with a sequence of the time-domain resource units in the first frequency-domain resource unit.

Optionally, in the embodiment of the disclosure, the time-domain resource unit may be at least one of a symbol, a symbol group, a slot, or a mini-slot.

Optionally, in the embodiment of the disclosure, after the operation that the network device sends the first bitmap to the terminal device, the method further includes that: the network device sends first indication information to the terminal device. The first indication information is to indicate a time-domain resource not available for data transmission of the terminal device in the first frequency-domain resource unit.

Optionally, in the embodiment of the disclosure, the second indication information is a third bitmap. Each of the bits in the third bitmap corresponds to a respective one of the frequency-domain resource units in a system bandwidth. A value of each bit in the third bitmap is to indicate whether the frequency-domain resource unit corresponding to the bit is used for data transmission of the terminal device or not.

Optionally, in the embodiment of the disclosure, the method further includes that: the network device sends second indication information to the terminal device. The second indication information is to indicate at least one frequency-domain resource unit allocated for the terminal device by the network device. The at least one frequency-domain resource unit includes the first frequency-domain resource unit.

Optionally, in the embodiment of the disclosure, the second indication information is a third bitmap. Each of the bits in the second bitmap corresponds to a respective one of the frequency-domain resource units in a system bandwidth. A value of each bit in the third bitmap is to indicate whether the frequency-domain resource unit corresponding to the bit is used for data transmission of the terminal device or not.

Optionally, in the embodiment of the disclosure, the second indication information is specifically used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

Optionally, in the embodiment of the disclosure, the frequency-domain resource unit may be a PRB, an RBG, or a sub-band.

It is to be understood that interaction between the network device and the terminal device and related properties, functions and the like described from the network device side correspond to related properties and functions described from the terminal device side. That is, if the terminal device sends information to the network device, the network device may correspondingly receive the information. For simplicity, no more elaborations will be made herein.

It is also to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

Figure 9:
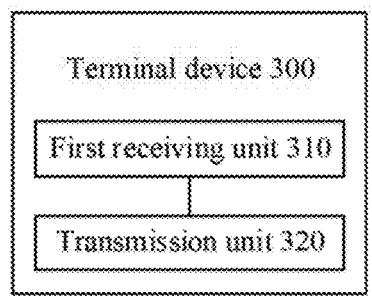
FIG. 9 is a schematic block diagram of a terminal device according to an embodiment of the disclosure.

FIG. 9 is a schematic block diagram of a signal transmission terminal device 300 according to an embodiment of the disclosure. As illustrated in FIG. 9, the terminal device 300 includes a first receiving unit 310 and a transmission unit 320.

The first receiving unit 310 is configured to receive a first bitmap from a network device. The first bitmap is to indicate a time-domain resource allocated for the terminal device by the network device in a first frequency-domain resource unit.

The transmission unit 320 is configured to perform data transmission with the network device on the time-domain resource indicated by the first bitmap.

From the above, according to the terminal device of the embodiment of the disclosure, continuous time-domain resources and discontinuous time-domain resources may be indicated, so that time-domain scheduling flexibility may be improved.

Optionally, in the embodiment of the disclosure, each bit in the first bitmap corresponds to at least one time-domain resource unit in the first frequency-domain resource unit, A value of each bit in the first bitmap is to indicate whether the at least one time-domain resource unit corresponding to the bit is used for data transmission or not.

Optionally, in the embodiment of the disclosure, each of the bits in the first bitmap corresponds to a respective one of the time-domain resource units in the first frequency-domain resource unit.

Optionally, in the embodiment of the disclosure, a left-to-right sequence of the bits in the first bitmap is consistent with a sequence of the time-domain resource units in the first frequency-domain resource unit.

Optionally, in the embodiment of the disclosure, the time-domain resource unit is at least one of a symbol, a symbol group, a slot, or a mini-slot.

Optionally, in the embodiment of the disclosure, the terminal device 300 includes a second receiving unit 330, configured to receive first indication information from the network device. The first indication information is to indicate a time-domain resource not available for data transmission of the terminal device in the first frequency-domain resource unit. The transmission unit 320 is specifically configured to perform data transmission with the network device on a time-domain resource, other than the time-domain resource indicated by the first indication information, in the time-domain resource indicated by the first bitmap.

Optionally, in the embodiment of the disclosure, the first indication information is a second bitmap. Each bit in the second bitmap corresponds to at least one time-domain resource unit in the first frequency-domain resource unit. A value of each bit in the second bitmap is to indicate whether the at least one time-domain resource unit corresponding to the bit is used for data transmission of the terminal device or not.

Optionally, in the embodiment of the disclosure, the terminal device 300 includes a third receiving unit 340, configured to receive second indication information from the network device. The second indication information is to indicate at least one frequency-domain resource unit allocated for the terminal device by the network device. The at least one frequency-domain resource unit includes the first frequency-domain resource unit.

Optionally, in the embodiment of the disclosure, the second indication information is a third bitmap. Each of the bits in the third bitmap corresponds to a respective one of the frequency-domain resource units in a system bandwidth. A value of each bit in the third bitmap is to indicate whether the frequency-domain resource unit corresponding to the bit is configured for data transmission of the terminal device or not.

Optionally, in the embodiment of the disclosure, the second indication information is specifically used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

Optionally, in the embodiment of the disclosure, the frequency-domain resource unit is a PRB, an RBG or a sub-band.

It is to be understood that the terminal device 300 according to the embodiment of the disclosure may correspond to the terminal device in the method embodiments of the disclosure. The abovementioned and other operations and/or functions of each unit in the terminal device 300 are adopted to implement the corresponding operations executed by the terminal device in the method in FIG. 3 and will not be elaborated herein for simplicity.

Figure 10:
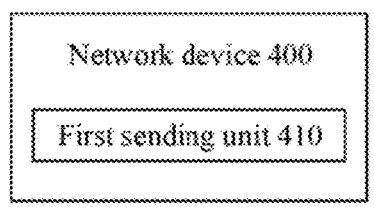
FIG. 10 is a schematic block diagram of a network device according to an embodiment of the disclosure.

FIG. 10 is a schematic block diagram of a network device 400 according to an embodiment of the disclosure. As illustrated in FIG. 10, the network device 400 includes a first sending unit 410.

The first sending unit 410 is configured to send a first bitmap to a first terminal device. The first bitmap is to indicate a time-domain resource allocated for the first terminal device by the network device in a first frequency-domain resource unit.

From the above, according to the network device of the embodiment of the disclosure, continuous time-domain resources and discontinuous time-domain resources may be indicated, so that time-domain scheduling flexibility may be improved.

Optionally, in the embodiment of the disclosure, each bit in the first bitmap corresponds to at least one time-domain resource unit in the first frequency-domain resource unit. A value of each bit in the first bitmap is to indicate whether the at least one time-domain resource unit corresponding to the bit is configured for data transmission of the first terminal device or not.

Optionally, in the embodiment of the disclosure, each of the bits in the first bitmap corresponds to a respective one of the time-domain resource units in the first frequency-domain resource unit.

Optionally, in the embodiment of the disclosure, a left-to-right sequence of the bits in the first bitmap is consistent with a sequence of the time-domain resource units in the first frequency-domain resource unit.

Optionally, in the embodiment of the disclosure, the time-domain resource unit is at least one of a symbol, a symbol group, a slot, or a mini-slot.

Optionally, in the embodiment of the disclosure, the network device 400 further includes a second sending unit 420, configured to send first indication information to the first terminal device. The first indication information is to indicate a time-domain resource not available for data transmission of the terminal device in the first frequency-domain resource unit.

Optionally, in the embodiment of the disclosure, the first indication information is a second bitmap. Each bit in the second bitmap corresponds to at least one time-domain resource unit in the first frequency-domain resource unit. A value of each bit in the second bitmap is to indicate whether the at least one time-domain resource unit corresponding to the bit is configured for data transmission of the terminal device or not.

Optionally, in the embodiment of the disclosure, the network device 400 includes a third sending unit 430, configured to send second indication information to the terminal device. The second indication information is to indicate at least one frequency-domain resource unit allocated for the first terminal device by the network device. The at least one frequency-domain resource unit includes the first frequency-domain resource unit.

Optionally, in the embodiment of the disclosure, the second indication information is a third bitmap. Each of the bits in the third bitmap corresponds to a respective one of the frequency-domain resource units in a system bandwidth. A value of each bit in the third bitmap is to indicate whether the frequency-domain resource unit corresponding to the bit is configured for data transmission of the terminal device.

Optionally, in the embodiment of the disclosure, the second indication information is specifically used to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

Optionally, in the embodiment of the disclosure, the frequency-domain resource unit is a PRB, an RBG, or a sub-band.

It is to be understood that the network device 400 according to the embodiment of the disclosure may correspond to the network device in the method embodiments of the disclosure. The abovementioned and other operations and/or functions of each unit in the network device 400 are adopted to implement the corresponding operations executed by the network device in the method in FIG. 8 and will not be elaborated herein for simplicity.

As illustrated in FIG. 1I, an embodiment of the disclosure also provides a terminal device 500. The terminal device 500 may be the terminal device 300 in FIG. 9, and may be configured to execute operations of the terminal device in the method 100 illustrated in FIG. 3. The terminal device 500 includes an input interface 510, an output interface 520, a processor 530 and a memory 540. The input interface 510, the output interface 520, the processor 530 and the memory 540 may be connected through a bus system. The memory 540 is configured to store a program, instructions, or a code. The processor 530 is configured to execute the program, the instructions or the code in the memory 540 to control the input interface 510 to receive a signal, control the output interface 520 to send a signal and complete operations in the method embodiments.

From the above, according to the terminal device of the embodiment of the disclosure, continuous time-domain resources and discontinuous time-domain resources may be indicated, so that time-domain scheduling flexibility may be improved.

It is to be understood that, in the embodiment of the disclosure, the processor 530 may be a central processing unit (CPU). The processor 530 may also be another universal processor, a digital signal processor, an application specific integrated circuit, a field-programmable gate array or another programmable logic device, discrete gate or transistor logic device and discrete hardware component and the like. The universal processor may be a microprocessor. Or, the processor may also be any conventional processor and the like.

The memory 540 may include a read-only memory (ROM) and a random access memory (RAM) and provides instructions and data for the processor 530. A part of the memory 540 may further include a non-volatile RAM. For example, the memory 540 may further store information of a device type.

In an implementation process, each operation of the method may be implemented by an integrated logic circuit of hardware in the processor 530 or instructions in a software form. The operations of the method disclosed in combination with the embodiments of the disclosure may be directly executed and completed by a hardware processor or executed and completed by a combination of hardware and software modules in the processor. The software module may be located in a mature storage medium in the art such as a RAM, a flash memory, a ROM, a programmable ROM or electrically erasable programmable ROM and a register. The storage medium is located in the memory 540. The processor 530 reads information from the memory 540 and completes the operations of the method in combination with hardware. No more detailed descriptions will be made herein to avoid repetitions.

Figure 11:
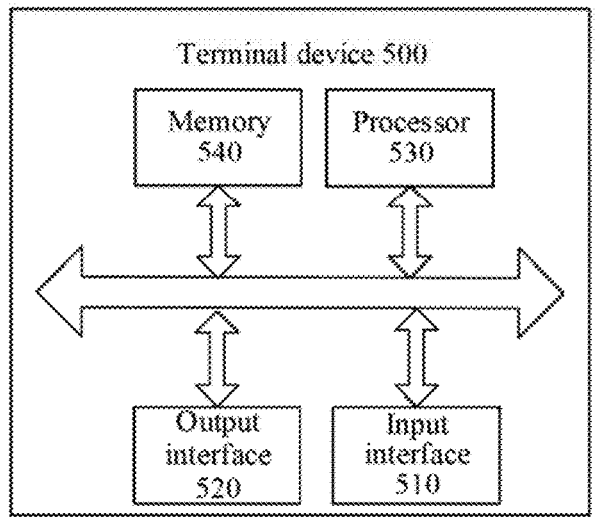
FIG. 11 is another schematic block diagram of a terminal device according to an embodiment of the disclosure.

In a specific implementation, the first receiving unit 310, the second receiving unit 320 and the third receiving unit 330 in the terminal device 300 may be implemented by the input interface 510 in FIG. 11.

Figure 12:
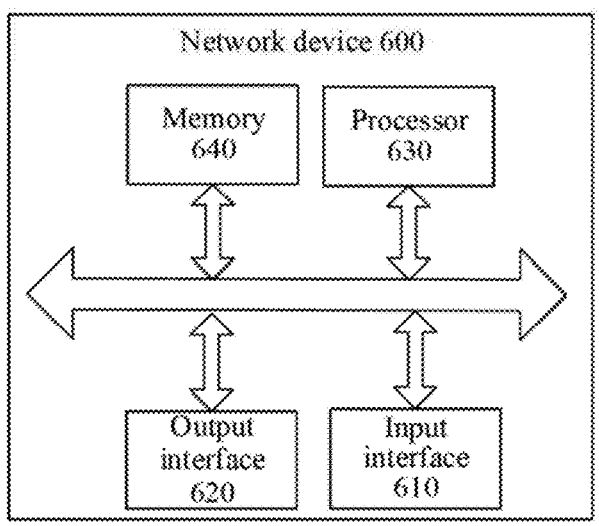
FIG. 12 is another schematic block diagram of a network device according to an embodiment of the disclosure.

As illustrated in FIG. 12, an embodiment of the disclosure also provides a network device 600. The network device 600 may be the network device 400 in FIG. 10, and may be configured to execute operations of the network device in the method 200 illustrated in FIG. 8. The network device 600 includes an input interface 610, an output interface 620, a processor 630 and a memory 640. The input interface 610, the output interface 620, the processor 630 and the memory 640 may be connected through a bus system. The memory 640 is configured to store a program, instructions, or a code. The processor 630 is configured to execute the program, the instructions, or the code in the memory 640 to control the input interface 610 to receive a signal, control the output interface 620 to send a signal and complete operations in the method embodiments.

From the above, according to the network device of the embodiment of the disclosure, continuous time-domain resources and discontinuous time-domain resources may be indicated, so that time-domain scheduling flexibility may be improved.

It is to be understood that, in the embodiment of the disclosure, the processor 630 may be a CPU. The processor 630 may also be another universal processor, a digital signal processor, an application specific integrated circuit, a field-programmable gate array or another programmable logic device, discrete gate or transistor logic device and discrete hardware component and the like. The universal processor may be a microprocessor. Or, the processor may also be any conventional processor and the like.

The memory 640 may include a ROM and a RAM and provides instructions and data for the processor 630. A part of the memory 640 may further include a non-volatile RAM. For example, the memory 640 may further store information of a device type.

In an implementation process, each operation of the method may be implemented by an integrated logic circuit of hardware in the processor 630 or instructions in a software form. The operations of the method disclosed in combination with the embodiments of the disclosure may be directly executed and completed by a hardware processor or executed and completed by a combination of hardware and software modules in the processor. The software module may be located in a mature storage medium in the art such as a RAM, a flash memory, a ROM, a programmable ROM or electrically erasable programmable ROM and a register. The storage medium is located in the memory 640. The processor 630 reads information from the memory 640 and completes the operations of the method in combination with hardware. No more detailed descriptions will be made herein to avoid repetitions.

In a specific implementation, the first sending unit 410, the second sending unit 420 and the third sending unit 430 may be implemented by the output interface 620 in FIG. 12.

An embodiment of the disclosure also discloses a computer-readable storage medium having stored thereon one or more programs including instructions that, when executed by a portable electronic device including multiple application programs, enable the portable electronic device to execute the method of the embodiment illustrated in FIG. 3 or FIG. 8.

An embodiment of the disclosure also discloses a computer program, which includes instructions, the computer program being executed by a computer to enable the computer to execute corresponding operations in the method of the embodiment illustrated in FIG. 3 or FIG. 8.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the an may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and pans displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for wireless communication, comprising:
   receiving, by a terminal device, a first bitmap from a network device, wherein the first bitmap is to indicate one or more time-domain resource units allocated for the terminal device by the network device in a first frequency-domain resource unit; and
   performing, by the terminal device, data transmission with the network device on the q or more time-domain resource units indicated by the first bitmap,
   wherein each bit in the first bitmap corresponds to at least one time-domain resource unit in the first frequency-domain resource unit, and a value of each bit in the first bitmap is to indicate whether the at least one time-domain resource unit corresponding to the bit is used for data transmission of the terminal device.

2. The method of claim 1, wherein each of bits in the first bitmap corresponds to a respective one of time-domain resource units in the first frequency-domain resource unit.

3. The method of claim 1, wherein a left-to-right sequence of bits in the first bitmap is consistent with a sequence of time-domain resource units in the first frequency-domain resource unit.

4. The method of claim 1, wherein h time-domain resource unit comprises at least one of a symbol, a symbol group, a slot, or a mini-slot.

5. The method of claim 1, further comprising:
   receiving, by the terminal device, second indication information from the network device, wherein the second indication information is to indicate at least one frequency-domain resource unit allocated for the terminal device by the network device, and the at least one frequency-domain resource unit comprises the first frequency-domain resource unit.

6. The method of claim 5, wherein the second indication information is a third bitmap, each of bits in the third bitmap corresponds to a respective one of frequency-domain resource units in a system bandwidth, and a value of each bit in the third bitmap is to indicate whether the frequency-domain resource unit corresponding to the bit is used for data transmission of the terminal device.

7. The method of claim 5, wherein the second indication information is to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

8. The method of claim 1, wherein the first frequency-domain resource unit comprises a physical resource block (PRB), a resource block group (RBG), or a sub-band.

9. A terminal device, comprising:
   an input interface, configured to receive a first bitmap from a network device, wherein the first bitmap is to indicate one or more time-domain resource units allocated for the terminal device by the network device in a first frequency-domain resource unit; and
   an output interface, configured to perform data transmission with the network device on the one or more time-domain resource units indicated by the first bitmap,
   wherein each bit in the first bitmap corresponds to at least one time-domain resource unit in the first frequency-domain resource unit, and a value of each bit in the first bitmap is to indicate whether the at least one time-domain resource unit corresponding to the bit is used for data transmission of the terminal device.

10. The terminal device of claim 9, wherein each of bits in the first bitmap corresponds to a respective one of time-domain resource units in the first frequency-domain resource unit.

11. The terminal device of claim 9, wherein a left-to-right sequence of bits in the first bitmap is consistent with a sequence of time-domain resource units in the first frequency-domain resource unit.

12. The terminal device of claim 9, wherein a time-domain resource unit comprises at least one of a symbol, a symbol group, a slot, or a mini-slot.

13. The terminal device of claim 9, wherein the input interface is further configured to receive first indication information from the network device, wherein the first indication information is to indicate a time-domain resource unit not available for data transmission of the terminal device in the first frequency-domain resource unit, and the output interface is specifically configured to:

perform data transmission with the network device on the one or more time-domain resource units indicated by the first bitmap, other than the time-domain resource unit indicated by the first indication information.

14. The terminal device of claim 13, wherein the first indication information is a second bitmap, each bit in the second bitmap corresponds to at least one time-domain resource unit in the first frequency-domain resource unit, and a value of each bit in the second bitmap is to indicate whether the at least one time-domain resource unit corresponding to the bit is used for data transmission of the terminal device.

15. The terminal device of claim 9, wherein the input interface is further configured to receive second indication information from the network device, wherein the second indication information is to indicate at least one frequency-domain resource unit allocated for the terminal device by the network device, and the at least one frequency-domain resource unit comprises the first frequency-domain resource unit.

16. The terminal device of claim 15, wherein the second indication information is a third bitmap, each of bits in the third bitmap corresponds to a respective one of frequency-domain resource units in a system bandwidth, and a value of each bit in the third bitmap is to indicate whether the frequency-domain resource unit corresponding to the bit is use for data transmission of the terminal device.

17. The terminal device of claim 15, wherein the second indication information is to indicate at least two of a starting position of the at least one frequency-domain resource unit in a system bandwidth, an ending position of the at least one frequency-domain resource unit in the system bandwidth, or a frequency-domain length of the at least one frequency-domain resource unit.

18. The terminal device of claim 9, wherein the first frequency-domain resource unit comprises a physical resource block (PRB), a resource block group (RBG), or a sub-band.

* * * * *